United States Patent
Saha et al.

(10) Patent No.: US 7,920,680 B2
(45) Date of Patent: Apr. 5, 2011

(54) VOIP CALLER AUTHENTICATION BY VOICE SIGNATURE CONTINUITY

(75) Inventors: Debanjan Saha, Mohegan Lake, NY (US); Zon-Yin Shae, South Salem, NY (US); Kunwadee Sripanidkulchai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/061,096

(22) Filed: Apr. 2, 2008

(65) Prior Publication Data

US 2009/0276217 A1    Nov. 5, 2009

Related U.S. Application Data

(63) Continuation of application No. 11/350,687, filed on Feb. 9, 2006, now abandoned.

(51) Int. Cl.
*H04M 1/64* (2006.01)
*H04M 11/00* (2006.01)
*H04M 15/06* (2006.01)
*H04M 3/42* (2006.01)
*H04L 12/66* (2006.01)
*G10L 15/00* (2006.01)
*G10L 21/00* (2006.01)

(52) U.S. Cl. ............. 379/88.02; 379/88.13; 379/142.04; 379/210.02; 370/352; 704/231; 704/273

(58) Field of Classification Search ................ 379/88.02, 379/88.13, 142.04–142.06, 210.02; 370/352–356; 704/231, 273
See application file for complete search history.

(56) References Cited

U.S. PATENT DOCUMENTS

| | | | | |
|---|---|---|---|---|
| 6,067,347 | A * | 5/2000 | Farris et al. | 379/88.01 |
| 6,141,644 | A * | 10/2000 | Kuhn et al. | 704/273 |
| 6,219,640 | B1 * | 4/2001 | Basu et al. | 704/246 |
| 6,650,888 | B1 * | 11/2003 | Cook | 455/410 |
| 6,678,359 | B1 * | 1/2004 | Gallick | 379/88.17 |
| 6,757,823 | B1 * | 6/2004 | Rao et al. | 713/153 |
| 7,127,237 | B2 * | 10/2006 | Naruse et al. | 455/415 |
| 7,212,613 | B2 * | 5/2007 | Kim et al. | 379/88.02 |
| 7,324,946 | B2 * | 1/2008 | Novack et al. | 704/273 |
| 7,412,386 | B2 * | 8/2008 | Janke et al. | 704/254 |
| 7,493,257 | B2 * | 2/2009 | Kim et al. | 704/240 |
| 7,529,669 | B2 * | 5/2009 | Ravi et al. | 704/249 |
| 2003/0074201 | A1 * | 4/2003 | Grashey et al. | 704/273 |
| 2004/0008666 | A1 * | 1/2004 | Hardjono | 370/352 |
| 2004/0066916 | A1 * | 4/2004 | Brown et al. | 379/88.01 |
| 2007/0150276 | A1 * | 6/2007 | Srivastava et al. | 704/246 |
| 2007/0201443 | A1 * | 8/2007 | Saha et al. | 370/356 |
| 2008/0195395 | A1 * | 8/2008 | Kim et al. | 704/273 |

* cited by examiner

*Primary Examiner* — Fan Tsang
*Assistant Examiner* — Mohammad Islam
(74) *Attorney, Agent, or Firm* — Tutunjian & Bitetto PC; Brian P. Verminski, Esq.

(57) ABSTRACT

There are provided methods and systems for authenticating a user. A method includes receiving a voice signature certificate corresponding to a setup portion of a Voice over Internet Protocol (VoIP) call. The VoIP call further has a voice conversation portion. The voice signature certificate includes a voice signature segment. The method further includes reproducing the voice signature segment to enable verification of voice continuity from the setup portion to the voice conversation portion. The verification is performing by comparing the voice signature segment to a user's voice during the voice conversation portion.

20 Claims, 2 Drawing Sheets

VOIP CALLER AUTHENTICATION BY VOICE SIGNATURE CONTINUITY

CROSS-REFERENCE TO RELATED APPLICATIONS

This application is a continuation of U.S. application Ser. No. 11/350,687, filed on Feb. 9, 2006, now abandoned, which is incorporated by reference herein in its entirety.

BACKGROUND

1. Technical Field

The present invention relates generally to voice communications and, more particularly, to Voice over Internet Protocol (VOIP) caller authentication by voice signature continuity.

2. Description of the Related Art

Traditional Public Switched Telephone Network (PSTN) telephone networks provide a method (hereinafter referred to as caller identification or caller ID, in short) that allows a called party to identify a calling party. With the advance of the Voice over Internet Protocol (VoIP) environment, the secure authentication of caller ID has disappeared. A calling party can spoof the caller ID at will. Moreover, even when the caller ID is initially correct, the corresponding voice path of the Session Initiation Protocol (SIP) session can be hijacked such that a called party talks to a different person than that identifier by the caller ID after the SIP signaling path is successfully established.

Although there are some mechanisms in SIP/VoIP to provide authentication and security for VoIP calls, these mechanisms all require a public key infrastructure (PKI) to provide the certificate and encryption key for each phone. A PKI for every phone does not currently exist, and will not be available for the foreseeable future. Moreover, VoIP converted traditional phones (by a VoIP gateway or a VoIP conversation device directly attached to a Plain Old Telephone Service (POTS) phone) and most conventional VoIP phones do not implement the advance authentication and encryption mechanism.

SUMMARY

Embodiments of the present invention are directed to Voice Over Internet Protocol (VOIP) caller authentication by voice signature continuity.

According to an aspect of the present invention, there is provided a method for authenticating a user. The method includes receiving a voice signature certificate corresponding to a setup portion of a Voice over Internet Protocol (VoIP) call. The VoIP call further has a voice conversation portion. The voice signature certificate includes a voice signature segment. The method further includes reproducing the voice signature segment to enable verification of voice continuity from the setup portion to the voice conversation portion. The verification is performed by comparing the voice signature segment to a user's voice during the voice conversation portion.

According to another aspect of the present invention, there is provided a method for authenticating a user. The method includes forming a voice signature certificate for the user. The voice signature certificate includes a voice signature segment. The method includes sending the voice signature certificate to a called device in response to a setup portion of a Voice over Internet Protocol (VoIP) call to the called device, to enable a subsequent verification of voice continuity from the setup portion to a subsequent voice signature portion of the VoIP call.

According to yet another aspect of the present invention, there is provided a system for authenticating a user. The system includes a voice signature continuity verification device configured to verify a voice continuity of the user from a setup portion to a voice conversation portion of a Voice over Internet Protocol (VoIP) call, by receiving a voice signature certificate corresponding to the setup portion of the VoIP call, the voice signature certificate including a voice signature segment, and by reproducing the voice signature segment to enable verification of the voice continuity. The verification is performed by comparing the voice signature segment to a user' voice during the voice conversation portion.

According to still another aspect of the present invention, there is provided a system for authenticating a user. The system includes a voice signature certificate forming device configured to form a voice signature certificate for the user. The voice signature certificate includes a voice signature segment. The system further includes a call setup voice signature certificate manager configured to send the voice signature certificate to a called device in response to a setup portion of a Voice over Internet Protocol (VoIP) call to the called device, to enable a subsequent verification of voice continuity from the setup portion to a subsequent voice signature portion of the VoIP call.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
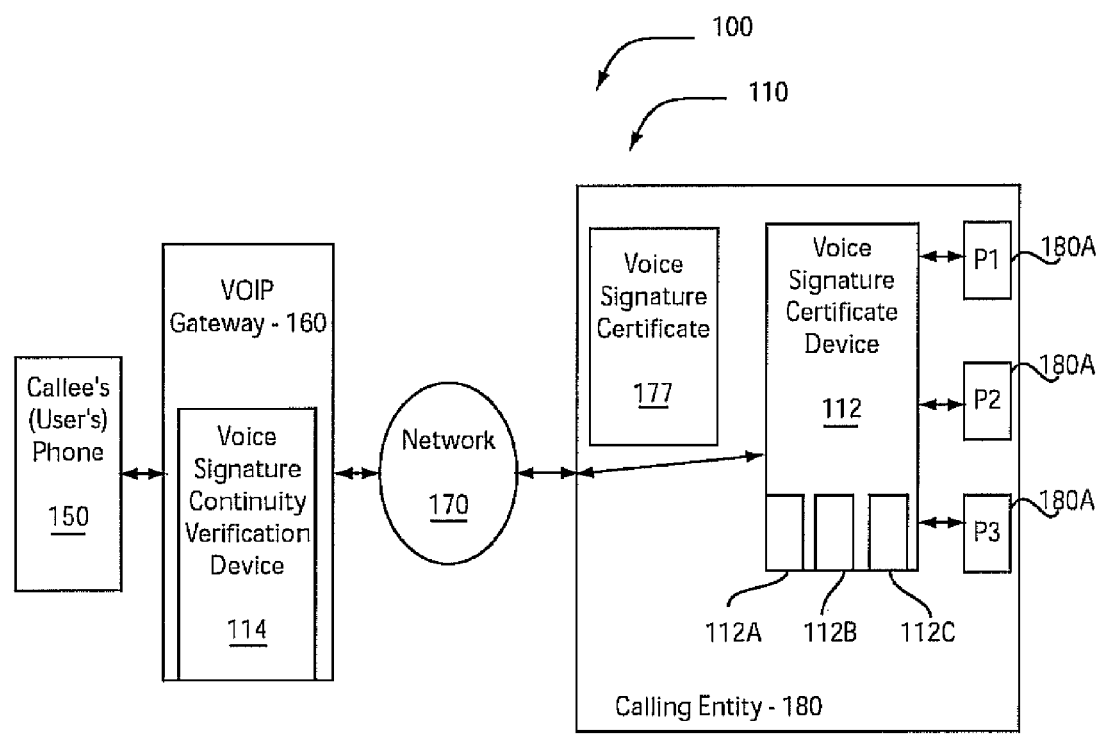
FIG. 1 is a diagram illustrating an exemplary environment in which embodiments of the present invention may be applied.

Embodiments of the present invention implement methods and systems for voice over Internet Protocol (VoIP) authentication by voice signature continuity. By utilizing voice signature continuity, it may be verified whether or not the person identified by a caller identification is the same person speaking during the corresponding voice conversation. That is, voice signature continuity may be utilized such that a voice signature sent to a called party or called machine during a call session setup matches a voice signature sent to the called party or called device during the subsequent corresponding voice conversation.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. Such software includes but is not limited to firmware, resident software, middleware, microcode, and so forth.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, an environment in which embodiments of the present invention may be applied is indicated generally by the reference numeral 100.

The environment 100 includes a called party's phone 150, a Voice over Internet Protocol (VoIP) gateway 160, a network (e.g., the Internet) 170, and a calling entity 180 (e.g., a bank, etc.). The calling entity 180 may include one or more phones 180A. The called party's phone 150 is connected in signal communication with the VoIP gateway 160 which, in turn, is connected to the network 170. The network is connected in signal communication with the calling entity 180.

For illustrative purposes, the calling entity 180 is one that includes multiple phones and, hence, multiple possible calling parties. Of course, embodiments of the present invention are not limited to such a configuration and may be implemented with respect to different numbers of calling entities (e.g., more than one) and different numbers of calling parties (e.g., one or more than one) at each of the calling entities than that shown in FIG. 1. Moreover, it is to be appreciated that while the voice signature certificate is described herein with respect to a single voice signature corresponding to a single calling party being included in the voice signature certificate, in other embodiments, more than one voice signature may be included in a voice signature certificate for cases where more than one possible calling party may call from the same calling entity. In such a case, it is preferably, but not mandatory, that the included voice signatures be short enough so as to not cause undue delay in listening/evaluating the included voice signatures with respect to the actual voice of the calling party during the voice conversation portion of the call.

An illustrative embodiment of the present invention includes a system 110 for Voice over Internet Protocol (VOIP) caller authentication by voice signature continuity. The system 110 includes a voice signature certificate device 112 and a voice signature continuity verification device 114.

The voice signature certificate device 112 may include a voice signature extractor 112A, a voice signature certificate forming device 112B, and a call setup voice signature certificate manager 112C.

The voice signature certificate device 112 may be configured to process a voice signature certificate 177 during a call setup. For example, the voice signature certificate forming device 112B may be configured to form a voice signature certificate, e.g., using a voice signature extracted by the voice signature extractor 112A. The voice signature certificate 177 may be pre-created (i.e., prior to a particular call(s)) or dynamically created upon the initiation of a call (i.e., upon call setup). The voice signature certificate manager 112C may be configured to send the voice signature certificate at an appropriate time. The voice signature certificate may be managed by the voice signature certificate manager 112C so that the voice signature certificate is sent to a called device in response to the initiation of a call to the called device or at some other time (e.g., earlier than call setup in preparation for a known incoming call from a particular calling party). The call setup may involve, e.g., Session Initiation Protocol (SIP).

The voice signature certificate includes a text segment to identify the ID of the calling party or the calling party's company (hereinafter collectively referred to as the ID of the caller/calling party or the caller ID). The voice signature certificate also includes a voice segment that includes the voice signature of the calling party.

The voice signature can be, e.g., but is not limited to, a few seconds (or more) of speech data from the calling party. The voice signature can be extracted from the calling party using the voice signature extractor 112A. The voice signature extractor 112A may simply include an acoustic transducer (e.g., a microphone), optional processing circuitry (analog to digital converter, filters, etc.), and a corresponding memory device, or may involve the use of a speaker recognition system to perform the voice signature extraction. The voice certificate can optionally be signed by, e.g., a known certificate provider.

The voice signature certificate may be sent from the calling party to the called party during call setup (e.g., during SIP session setup).

The voice signature continuity verification device 114 may be configured to optionally verify the voice signature certificate, extract the voice signature from the certificate, and reproduce the voice signature to the called party. The voice signature extracted from the voice signature certificate serves as a reference voice pattern for the corresponding voice conversation. This allows the called party (or the computer on behalf of the called party) to verify the continuity between the voice signature (included in the voice signature certificate) and the corresponding voice conversation, to authenticate the calling party. For example, the calling party is authenticated when the voice signature corresponding to the set up portion of a call (and extracted from the voice signature certificate) matches the voice of the calling party during the voice conversation portion of the call. Moreover, text portion in the voice signature certificate may be used in a caller ID function to redundantly authenticate the calling party. Accordingly, the present invention advantageously prevents the media path from being hijacked.

The voice signature continuity verification device 114 can be implemented, e.g., at a VoIP to Public Switched Telephone Network (PSTN) gateway, within a SIP user agent disposed within the phone of the called party, or within or associated with another entity within or operatively coupled to the phone of the called party as readily contemplated by one of ordinary skill in this and related arts, while maintaining the spirit of the present invention.

The voice signature continuity verification device 114 may be further configured to verify the voice signature continuity between the voice certificate and the corresponding voice conversation. Implementations of the voice signature continuity verification device 114 may in involve, but are not limited to, a computer-based speaker identification mechanism and/or a human. That is, in the latter case, a person (the called party himself or herself) may be readily utilized to match the voice signature provided during the call session setup (i.e., the voice signature included in the voice signature certificate) with the voice of the calling party during the subsequent corresponding voice conversation to ensure that the voice signatures are the same.

It is to be appreciated that the functions of each of the elements of system 110 may be embodied in other devices than those shown in FIG. 1 and/or may be embodied in more than one device. For example, the functions performed by the voice signature continuity verification device 114 may be so performed by more than one physical device. Given the teachings provided herein, these and other variations and configurations of the elements of system 110 may be readily determined by one of ordinary skill in this and related arts while maintaining the spirit of the present invention.

Figure 2:
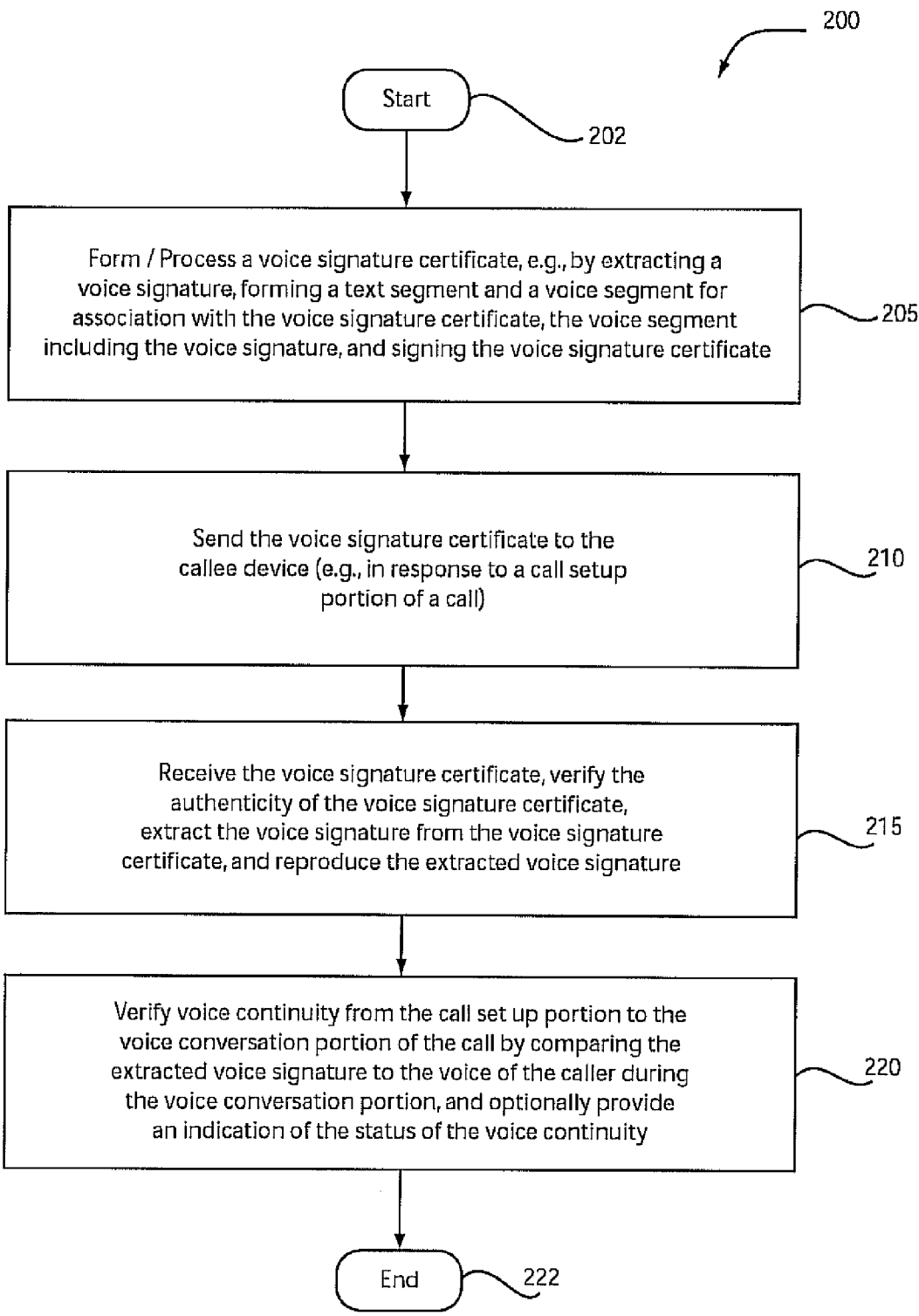
FIG. 2 is a diagram illustrating an exemplary method for voice over Internet Protocol (VoIP) authentication by voice signature continuity.

Turning to FIG. 2, a method for Voice over Internet Protocol (VoIP) authentication by voice signature continuity is indicated generally by the reference numeral 200.

The method 200 includes a start block 202 that passes control to a function block 205. The function block 205 forms/processes a voice signature certificate, and passes control to a function block 210. Regarding the function block 205, the voice signature certificate is formed/processed by the voice signature certificate device 112. The formation/creation of the voice signature certificate may involve extracting a voice signature from a calling party, and associating a text segment and a voice segment to the voice signature certificate such that the voice segment includes the extracted voice signature. Moreover, the processing of the voice signature certificate may involve the signing the voice signature certificate by a known certificate provider/certifier. As noted above, the text segment identifies the ID of the calling party or the calling party's company (hereinafter collectively referred to as the ID of the caller/calling party or caller ID), and the voice segment is for use during the subsequent corresponding voice conversation.

The function block 210 sends the voice signature certificate to the called device, and passes control to a function block 215. It is to be appreciated that the function block 210 may send the voice signature certificate to the called device in response to a call setup portion of a call such as, e.g., a VoIP call. It is to be further appreciated that while the voice signature certificate is sent to the called device, another device proximate to or along the path to the called device may intercept the voice signature certificate for processing (e.g., for processing as described with respect to function block 215) prior to the certificate or any data/information therein being ultimately forwarded to the actual called device.

The function block 215 receives the voice signature certificate, verifies the authenticity of the voice signature certificate, extracts the voice signature from the voice signature certificate, reproduces the extracted voice signature (e.g., audibly via a speaker, or otherwise provides a reproduction (e.g., involving signal processing and/or forwarding) for use by a speaker recognition system), and passes control to a function block 220.

The function block 220 verifies voice continuity from the set up portion to the voice conversation portion of the call by comparing the voice signature extracted from the voice signature certificate to the voice of the calling party during the voice conversation, to verify that the calling party who submitted the voice signature for use in the voice signature certificate (and also identified by the caller ID) is the same person who is speaking during the voice conversation portion of the call and, optionally, may provide an indication as to the status of the voice continuity (e.g., an audible indication on the speaker of the called device or a proximate gateway device or a visual indication on a display of the called device or a proximate gateway device), and passes control to an end block 222. The end block terminates the method 200. It is to be appreciated that the function block 220 verifies that the calling party during the voice conversation of the call is the same person who submitted the voice signature (e.g., corresponding to the call setup portion of the call) by using the continuity of the voice signature from the call setup portion to the voice conversation portion of the call. Accordingly, hijacking of the media path between the calling party and the called party is thwarted. It is to be appreciated that the present invention also thwarts spoofing of the caller ID, by using the voice data (namely the voice signature continuity) in determining calling party authenticity.

It is to be appreciated that the present invention may be implemented with respect to any type of phone capable of employing Voice over Internet Protocol (VoIP), including converted phones (e.g., traditional Plain Old Telephone Service (POTS) phones converted to use VoIP by, e.g., a VoIP gateway or a VoIP conversation device directly attached to a POTS phone). It is to be further appreciated while the present invention is described herein primarily with reference to a call setup portion and a subsequent corresponding voice conversation portion, the present invention may readily extended/varied to employ different times while still maintaining the spirit of the present invention. For example, a separate, earlier phone call or a simple, earlier data transmission may be used to send the voice signature certificate prior to a particular phone call when the actual voice of the calling party is to be compared in the voice continuity determination.

Having described preferred embodiments of a system and method for Voice over Internet Protocol (VoIP) authentication by voice signature certificate (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for authenticating a user, comprising:
   receiving a voice signature certificate corresponding to a setup portion of a Voice over Internet Protocol (VoIP) call, the VoIP call further having a voice conversation portion, the voice signature certificate including a voice signature segment; and
   reproducing the voice signature segment to enable verification of voice continuity from the setup portion to the voice conversation portion, the verification being performed by comparing the voice signature segment to a user's voice during the voice conversation portion.

2. The method of claim 1, further comprising verifying an authenticity of the voice signature certificate.

3. The method of claim 1, wherein said reproducing step comprises extracting the voice signature segment from the voice signature certificate for use by a speaker recognition system, and the method further comprises the step of comparing the voice signature segment to the user's voice using the speaker recognition system to determine whether a match exists there between.

4. The method of claim 1, wherein the setup portion uses Session Initiation Protocol (SIP).

5. The method of claim 1, wherein the voice signature certificate further includes a text segment identifying the user, and the method further comprises providing a caller identification (ID) function using the text segment included in the voice signature certificate.

6. The method of claim 1, wherein the voice conversation portion follows the setup portion.

7. The method of claim 1, wherein comparing the voice signature segment to the user's voice during the voice conversation portion comprises audibly reproducing the voice signature segment on a speaker for comparison against the user's voice during the voice conversation portion.

8. The method of claim 1, wherein a callee performs the comparison.

9. A method for authenticating a user, comprising:
  forming a voice signature certificate for the user, the voice signature certificate including a voice signature segment; and
  sending the voice signature certificate to a called device in response to a setup portion of a Voice over Internet Protocol (VoIP) call to the called device, to enable a subsequent verification of voice continuity from the setup portion to a subsequent voice conversation portion of the VoIP call.

10. The method of claim 9, wherein said forming step forms the voice signature certificate to further include a text portion identifying the user for use in a subsequent caller identification (ID) function, to collectively identify the user based on the caller ID function and the voice continuity.

11. The method of claim 9, further comprising signing the voice signature certificate by one of a certificate signing authority or a certificate provider.

12. The method of claim 9, further comprising the step of extracting a voice signature of the user for the voice signature segment.

13. A system for authenticating a user, comprising:
  a voice signature continuity verification device configured to verify a voice continuity of the user from a setup portion to a voice conversation portion of a Voice over Internet Protocol (VoIP) call, by receiving a voice signature certificate corresponding to the setup portion of the VoIP call, the voice signature certificate including a voice signature segment, and by reproducing the voice signature segment to enable verification of the voice continuity, the verification being performed by comparing the voice signature segment to a user' voice during the voice conversation portion.

14. The system of claim 13, wherein said voice signature continuity verification device is further configured to verity an authenticity of the voice signature certificate.

15. The system of claim 13, wherein said voice signature continuity verification device includes a speaker verification system configured to verify the voice continuity by comparing the voice segment portion to the user's voice to determine if a match exists there between.

16. The system of claim 13, wherein said voice signature continuity verification device includes an audible reproduction device configured to audibly reproduce the voice signature segment for comparison against the user's voice during the voice conversation portion.

17. The system of claim 13, wherein the setup portion uses Session Initiation Protocol (SIP).

18. A system for authenticating a user, comprising:
  a voice signature certificate forming device configured to form a voice signature certificate for the user, the voice signature certificate including a voice signature segment; and
  a call setup voice signature certificate manager configured to send the voice signature certificate to a called device in response to a setup portion of a Voice over Internet Protocol (VoIP) call to the called device, to enable a subsequent verification of voice continuity from the setup portion to a subsequent voice conversation portion of the VoIP call.

19. The system of claim 18, further comprising a certificate signing device configured to sign the voice signature certificate for subsequent use in authenticating the voice signature certificate.

20. The system of claim 18, further comprising a speech extractor configured to extract a voice signature of the user for the voice signature segment.

* * * * *